UNITED STATES PATENT OFFICE.

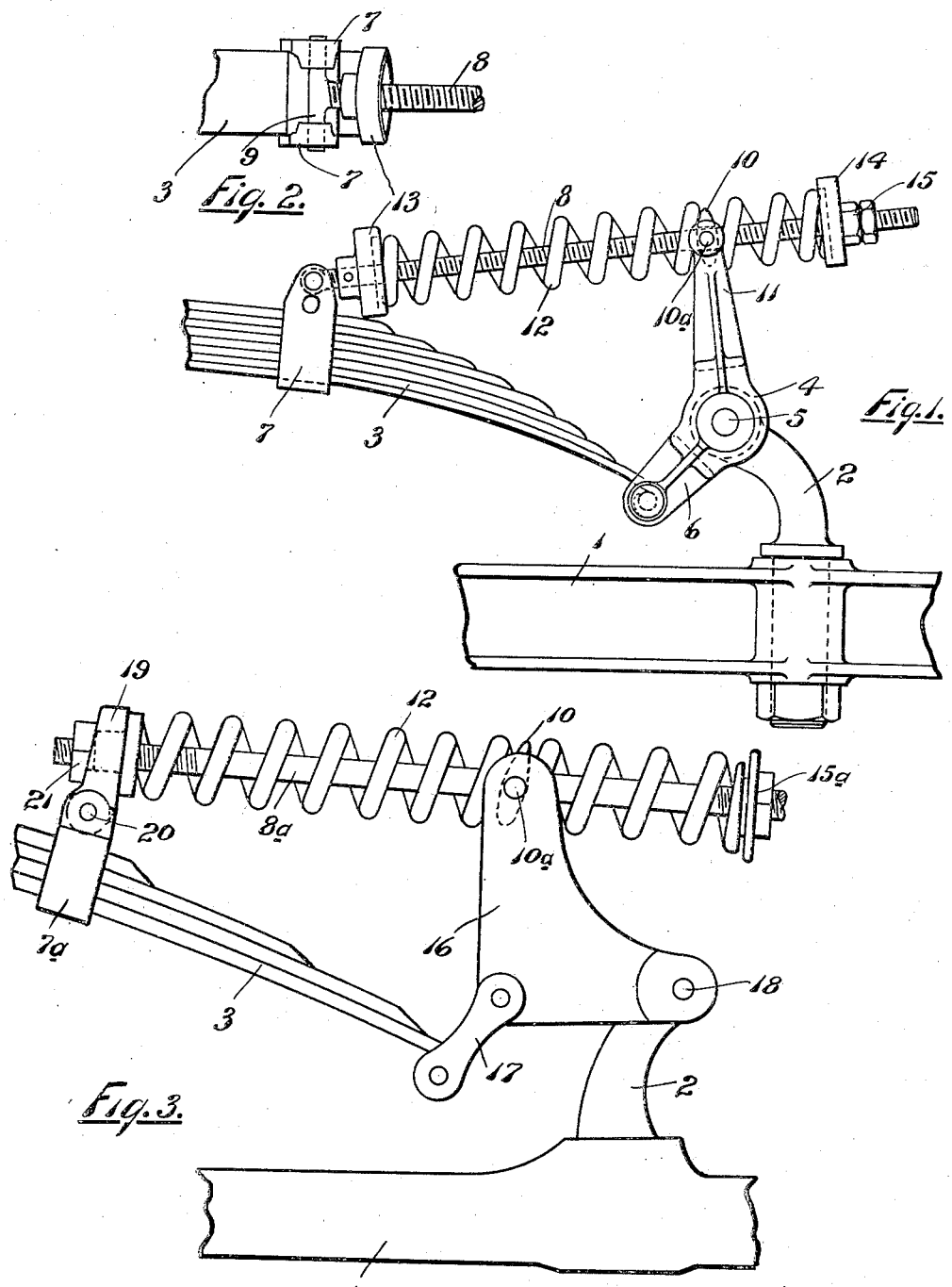

FREDERICK H. LAWTON, OF GRAND RAPIDS, MICHIGAN, ASSIGNOR TO MARGARET G. BOWSER, OF GRAND RAPIDS, MICHIGAN.

VEHICLE-SPRING CONSTRUCTION.

1,362,254.  Specification of Letters Patent.  Patented Dec. 14, 1920.

Application filed August 9, 1919. Serial No. 316,293.

*To all whom it may concern:*

Be it known that I, FREDERICK H. LAWTON, a citizen of the United States of America, residing at Grand Rapids, in the county of Kent and State of Michigan, have invented certain new and useful Improvements in Vehicle-Spring Construction; and I do hereby declare the following to be a full, clear, and exact description of the invention, such as will enable others skilled in the art to which it appertains to make and use the same.

This invention relates to a vehicle spring construction which is particularly adapted for application for use with motor vehicles, the Ford type of motor vehicle being best adapted for application of the construction as shown, though the invention is not in any sense limited to use on the one type of vehicle. It is an object and purpose of the invention to make a construction of this type in which the shocks of the road will be absorbed and lessened, and the rebound of the usual leaf springs checked so that a much more smooth and easy riding of the vehicle is had. A further object of the invention is to construct the device in such manner that it can be quickly and easily applied to Ford vehicles already built and this without the use of other than the usual labor employed at any garage. A still further object of the invention is to construct the device of comparatively few and simple parts whereby the cost of construction is kept low. All of these objects and purposes, together with many others not specifically enumerated at this time, will appear together with many novel constructions and arrangements of parts for attaining the same as understanding of the invention is had from the following description, taken in connection with the accompanying drawing, in which, Figure 1 is a fragmentary front elevation of one end of a vehicle axle and spring equipped with my invention.

Fig. 2 is a fragmentary plan view illustrating the connection of the device at one end to the leaf spring of the vehicle, and Fig. 3 is a view, similar to that shown in Fig. 1, of a modified form of construction serving the same ends.

Like reference characters refer to like parts in the different views of the drawing.

In the construction shown, the front axle 1 has posts 2 extending upwardly therefrom, between which a leaf spring 3 is placed. One end only of the axle is shown but the opposite end is the same and need not be shown and described, the construction at one end doing for both. With the rear axle, the posts which usually support the rear spring are attached to the brake housings at the ends of the axle, as is well known by all familiar with spring suspensions for Ford motor vehicles. The ends of the springs are usually connected to the posts by means of interposed shackles.

In my invention, the shackles are eliminated and a member 4 is pivotally mounted at the upper end of each post at 5, having depending arms 6 to which the ends of the spring 3 are pivotally connected, these arms serving the same purpose as the usual shackles.

A clip 7 is attached a distance from the end of the spring and its sides extend above the upper side of the spring, serving as supports for one end of a rod 8, which is formed with laterally extending arms 9 at such end which are pivotally mounted in the sides of the clip 7 as shown. Between the ends of the rod 8 a washer-like member is located, the rod passing loosely therethrough. This washer-like member has oppositely extending pintles $10^a$ which are rotatably mounted in the arms 11 cast integral with member 4 and arms 6 heretofore described. This disposes the member 10 between the arms 11, rod 8 also passing between said arms through the member 10.

A coiled spring 12 is placed around the rod 8, seating at one end against an abutment 13 adjustable on the rod and at its opposite end against another abutment 14 which may be also adjusted lengthwise of the rod, being held in place by locking nuts 15. The rod 8 extends a distance past the arms 11 so that the member 10 is interposed between two of the intermediate coils of the spring as shown.

Under the shocks of the road when the vehicle is in motion, there is a flattening of the leaf spring 3 and a turning movement of the member 4 about its pivot 5 which moves the upper ends of arms 11 toward the clip 7, the member 10 moving therewith and compressing that part of the spring between said member 10 and the abutment 13; while that part between the washer-like member 10 and the abutment 14 is stretched, it being designed that the ends of the spring shall be attached to the abutments. This checks and absorbs the shocks and on return of the spring 3 to normal position, with the consequent rebound beyond its normal position, the action with respect to the two parts of the spring is reversed, the rebound being progressively checked so that an exceptionally smooth and easy riding action is had. This alternate compression and expansion of the two parts of the spring also has the effect of keeping the spring elastic, there being little or no tendency for the coils of the spring to "wash" together and lose their force. The construction is simple and effective, is easily applied, and costs comparatively little for manufacture or installation, while the riding qualities of the vehicle equipped therewith are greatly improved.

In Fig. 3, a modified form is shown. The posts 2 are turned around and a substantially triangular shaped member 16 is pivotally connected thereto at one corner at 18, shackles 17 being pivotally connected at the opposite lower corner and serving to carry the adjacent end of the spring 3. The clip 7 is attached to the spring substantially as before and a member 19 extends above the clip and has pivotal connection thereto at its lower end as indicated at 20. A rod 8ª passes through the member 19 and receives a nut 21 at its end, said rod being equivalent to the previously described rod 8 and likewise passing through a washer-like member 10 which is mounted at the upper corner of the member 16, the same being divided at its upper end to receive the member 10. The spring is attached at one end to the member 19 and at its opposite end beyond the member 16 to a member 15 which is adjustable on the rod 8ª. The rod likewise may be drawn through the member 19 by turning nut 21, the two parts of the spring each side of the member 10 being thus adjusted as desired.

This construction has much the same action as that previously described, and the smooth and easy action is present with it as in the first construction shown in Fig. 1. The pivotal connection of the links 17 to member 16 allows some greater flexibility between the leaf spring 3 and the member 16 than is present between the spring 3 and the member 4, but the absorption of road shocks and checking of rebound takes place as before except that the degree varies due to the link or shackle connection at 17. Many other variations in structural detail may be resorted to without departing from the invention, and I do not wish to be limited to the specific detail shown but consider myself entitled to all structures which fall within the appended claims defining the invention.

I claim:

1. In combination, a vehicle axle, posts projecting upwardly at each end of the axle, a member pivotally mounted on the upper end of each post and having a part extending above the pivot, a leaf spring located above the axle, connections between the ends of said leaf spring and said members, a rod disposed above the end of the leaf spring and connected at one end thereto, said rod passing through the upper end of said upwardly extending part of the member, a coiled spring around the rod, means pivotally mounted on said part and interposed between two of the intermediate coils of the spring, and means on the rod adjacent each end thereof to which the respective ends of the coiled spring are secured, substantially as described.

2. In combination, a vehicle axle, posts projecting above and connected to the axle adjacent the ends thereof, a member pivotally mounted at the upper end of each post, said member including downwardly and inwardly extending arms and vertically extending arms, a leaf spring disposed between and connected to the lower ends of the first mentioned arms, a rod attached at one end to the leaf spring at each end a distance from said second mentioned arms of the member, a coiled spring around the rod, means on the rod at each end thereof to which the ends of the coiled spring are secured, and means on the said second mentioned arms of said member adapted to enter between successive coils at the intermediate portion of the spring, substantially as and for the purposes described.

3. In combination with a supporting post, a member pivotally connected at its upper end and including downwardly and inwardly extending arms and vertically extending arms, a leaf spring attached at one end to the lower ends of the first mentioned arms, a clip secured to the leaf spring a distance from its end, a rod pivotally connected to the clip above the leaf spring, a coiled spring around the rod, said rod and coiled spring passing between the upper ends of the second mentioned arms of said member, means adjacent each end of the rod and attached to the rod to which the ends of the coiled spring are secured, and means on said second mentioned arms adapted to pass between two coils of the spring where the spring passes between said arms, substantially as described.

In testimony whereof I affix my signature.

FREDERICK H. LAWTON.